(12) United States Patent
Fukumine

(10) Patent No.: US 8,936,872 B2
(45) Date of Patent: Jan. 20, 2015

(54) LITHIUM-ION SECONDARY BATTERY

(75) Inventor: Mayumi Fukumine, Kawasaki (JP)

(73) Assignee: Zeon Corporation, Tokyo (JP)

( * ) Notice: Subject to any disclaimer, the term of this patent is extended or adjusted under 35 U.S.C. 154(b) by 895 days.

(21) Appl. No.: 12/225,737

(22) PCT Filed: Mar. 20, 2007

(86) PCT No.: PCT/JP2007/055755
§ 371 (c)(1),
(2), (4) Date: Sep. 29, 2008

(87) PCT Pub. No.: WO2007/122947
PCT Pub. Date: Nov. 1, 2007

(65) Prior Publication Data
US 2009/0274958 A1    Nov. 5, 2009

(30) Foreign Application Priority Data
Mar. 31, 2006    (JP) .................................. 2006-097306

(51) Int. Cl.
*H01M 4/62*    (2006.01)
*H01M 10/26*    (2006.01)
*H01M 10/052*    (2010.01)
*H01M 4/13*    (2010.01)

(52) U.S. Cl.
CPC .............. *H01M 10/052* (2013.01); *H01M 4/13* (2013.01); *H01M 4/621* (2013.01); *H01M 4/622* (2013.01); *Y02E 60/122* (2013.01); *Y02T 10/7011* (2013.01)
USPC ........................................... 429/217; 429/207

(58) Field of Classification Search
USPC ................................................. 429/207, 217
See application file for complete search history.

(56) References Cited

U.S. PATENT DOCUMENTS

| 4,287,272 | A | * | 9/1981 | Machi et al. ................. 429/144 |
| 4,904,260 | A |   | 2/1990 | Ray et al. |
| 5,595,841 | A |   | 1/1997 | Suzuki et al. |
| 6,264,695 | B1 |  | 7/2001 | Stoy |
| 2004/0121232 | A1 | | 6/2004 | Kato et al. |
| 2004/0191630 | A1 | * | 9/2004 | Kawamura et al. ...... 429/231.95 |
| 2006/0228627 | A1 | | 10/2006 | Nakayama et al. |

FOREIGN PATENT DOCUMENTS

| JP | 8-287915 A | | 11/1996 |
| JP | 11-149929 A | | 6/1999 |
| JP | 2000-173608 A | | 6/2000 |
| JP | 2002-93420 A | | 3/2002 |
| JP | 2004-55493 A | | 2/2004 |
| JP | 2004-227974 A | | 8/2004 |
| JP | 2004227974 A | * | 8/2004 |
| JP | 2005-340072 A | | 12/2005 |
| JP | 2006-48932 A | | 2/2006 |
| WO | WO-97/48106 A1 | | 12/1997 |
| WO | WO-02/39518 A1 | | 5/2002 |

* cited by examiner

*Primary Examiner* — Ula C. Ruddock
*Assistant Examiner* — Daniel Gatewood
(74) *Attorney, Agent, or Firm* — Birch, Stewart, Kolasch & Birch, LLP

(57) ABSTRACT

The purpose of the present invention is to provide a lithium-ion secondary battery with small internal resistance, excellent load characteristics and low reduction in capacitance due to repeated discharge and charge.

The lithium-ion secondary battery of the present invention attaining the above purpose comprises a positive electrode, negative electrode and electrolyte; said positive electrode and negative electrode are configured by binding an active material layer, including an electrode active material and a binder, to a collector; the binder used for at least one of the positive electrode or negative electrode includes polymer particles; and the polymer particles satisfy the following properties:

swelling degree in the electrolyte of a sheet-like molded body, obtained by pressure molding of only the polymer particles, is 5 to 50%, and lithium ion conductivity of the sheet-like molded body swollen by the electrolyte is $1 \times 10^{-4}$ S·cm or more.

4 Claims, No Drawings

LITHIUM-ION SECONDARY BATTERY

BACKGROUND OF THE INVENTION

1. Field of the Invention

The present invention relates to a lithium-ion secondary battery. More particularly, this relates to a lithium-ion secondary battery, comprising polymer particles as a binder showing lithium ion conductivity due to including an electrolyte, and having small internal resistance and excellent load characteristics, and low reduction in capacitance due to repeated discharge and charge.

2. Description of the Related Art

In recent years, portable terminals such as notebook-sized personal computers, mobile phones and PDAs (Personal Digital Assistant) show growing popularity. As electronic power supplies of the portable terminals, nonaqueous electrolyte secondary batteries such as lithium-ion secondary battery are heavily used. Also, nonaqueous electrolyte secondary batteries are recently attracted attention in using as large-scaled electronic power supplies for electric cars and for electric power storage because of environment concern and resources problem. For large-scaled electronic power supplies for electric cars, high load characteristics are required, and for electric power storage usage, high lifetime characteristics are required.

In the lithium-ion secondary battery, a binder is used for mutually binding electrode active materials, and binding an electrode active material to a collector. Since the binder is nonconductive and not ion-conducting, large usage has caused increase in internal resistance and reduction in capacitance. Synthetic rubber-based polymer particle-type binder is proposed to use as a binder with strong binding force even when using small amounts (Patent Document 1). Then, as the synthetic rubber-based polymer particle type binder, styrene-butadiene rubber polymer particle, nitrile-butadiene rubber polymer particle, methyl methacrylate-butadiene rubber polymer particle, etc., are disclosed. These synthetic rubber-based polymer particle type binders show improvement in internal resistance and capacitance decrease while load characteristics are not sufficient.

Also, a lithium polymer battery using polymeric (polymer) gel-like electrolytes containing an organic electrolyte has been developed as a new type of thin-and-light batteries. The polymer electrolyte battery has been subject to various studies since Armand, et al. proposed a battery using polymer electrolyte comprising polyethylene oxide and electrolyte salt (Patent Documents 2 and 3). However, when using these polymers for gel electrolytes as binders, it results in insufficient binding strength and lowered cycle characteristics as well as safety problem such as short circuit due to peeling of an active material layer.

Patent Document 1: The Japanese Unexamined Patent Publication 2004-55493,

Patent Document 2: The Japanese Unexamined Patent Publication 2000-173608, and

Patent Document 3: WO97/48106

DISCLOSURE OF INVENTION

Problem to be Solved by the Invention

The present invention, proposed for improving the above problems, has a purpose to provide a lithium-ion secondary battery with small internal resistance, excellent load characteristics, and low reduction in capacitance due to repeated discharge and charge.

Means for Solving the Problem

The present inventor found, as a result of keen examinations, in a lithium-ion secondary battery comprising a positive electrode, a negative electrode and an electrolyte, the above purpose can be attained by using polymer particles as a binder for at least one of the positive electrode or negative electrode, the polymer particles having a specific range of swelling degree in the electrolyte and showing lithium ion conductivity due to including the electrolyte; and came to complete the present invention based on the findings.

Thus, according to the first aspect of the present invention, there is provided a lithium-ion secondary battery comprising a positive electrode, a negative electrode and an electrolyte, said positive electrode and negative electrode being configured by binding an active material layer, including an electrode active material and a binder, to a collector, wherein the binder used for at least one of the positive electrode or negative electrode includes polymer particles, and the polymer particles satisfy the following properties:

swelling degree in the electrolyte of a sheet-like molded body, obtained by pressure molding of only the polymer particles, is 5 to 50%, and lithium ion conductivity of the sheet-like molded body swollen by the electrolyte is $1\times10^{-4}$ S·cm or more.

A number average particle size of said polymer particles is preferably 0.01 to 10 μm.

The above polymer particles are preferably a cross-linked polymer cross-linked by heat or energy irradiation.

It is preferable that the above polymer comprises a structure having a lone electron-pair, and the structure having a lone electron-pair is preferably a nitrile group or an ether bond.

The electrolyte is preferably an organic electrolyte obtained by dissolving a lithium salt into carbonates.

Effects of the Invention

Since the lithium-ion secondary battery of the present invention uses a binder with excellent binding force and ion conductivity, it has small internal resistance, excellent load characteristics, and low reduction in capacitance due to repeated discharge and charge. The lithium-ion secondary battery of the present invention can be used in small-scaled batteries such as electronic power supplies of a variety of portable terminals, and in large-scaled batteries such as electronic power supplies for electric cars or for electric power storage usage. Particularly, it is preferred to use as large-scaled batteries because of excellent load characteristics and low reduction in capacitance due to repeated discharge and charge.

DESCRIPTION OF THE PREFERRED EMBODIMENTS

The lithium-ion secondary battery of the present invention comprises a positive electrode, a negative electrode, and an electrolyte, said positive electrode and negative electrode being configured by binding an active material layer, including an electrode active material and a binder, to a collector, wherein the binder used for at least one of the positive electrode or negative electrode includes polymer particles, and the polymer particles satisfy the following properties:

swelling degree in the electrolyte of a sheet-like molded body obtained by pressure molding of only the polymer particles, which represent an increase in length when being dipped in the electrolyte, is 5 to 50%, and lithium ion conductivity of the sheet-like molded body swollen by the electrolyte is $1 \times 10^{-4}$ S·cm or more.

In this context, the swelling degree of the polymer particles can be obtained as below. First, the polymer is subject to pressure molding to obtain a sheet-like molded body with 20 mm long, 20 mm wide and 100 μm thick. The sheet-like molded body is dipped in the electrolyte at 60° C. for 72 hours, draw out and wipe out the electrolyte from the surface of the molded body. Then, the swelling degree is obtained as an increase in length (%) of the molded body before and after dipping in the electrolyte.

Also, lithium ion conductivity when being swollen in the electrolyte can be obtained as below. First, a sheet-like molded body obtained as above is dipped in the electrolyte at 25° C. for 10 hours, draw out and wipe out the electrolyte from the surface of the molded body. The molded body is sandwiched by metallic electrodes to form an electrochemistry cell. AC voltage is applied between the electrodes of the electrochemistry cell, and complex impedance is measured by AC impedance method to obtain a call-call plot. Based on real impedance intercept in the call-call plot, the thickness of the sheet-like molded body and the area of the metallic electrode, lithium ion conductivity can be calculated. Details on measuring of lithium ion conductivity can be found in, for example, "In Electrochemical Methods, Fundamentals and Applications; Bard, A. J., Faulker, L. R., Eds.; John Wiley & Sons; New York, 2001" and "In Impedance Spectroscopy, Emphasizing Solid materials and systems; Macdonald, J. R., Ed.; John Wiley & Sons; New York, 1987."

The polymer particles used in the present invention are swollen by an electrolyte to effectively hold electrolyte in the void within the electrodes. It results in improving fluid retention to obtain a lithium-ion secondary battery with excellent cycle characteristics. The swelling degree of the polymer particles is 5 to 50%, preferably 5 to 20%. When the swelling degree is too low, too low fluid retention tends to cause deterioration in cycle characteristics; and too high swelling degree tends to result in lowering binding strength, also causing deterioration in cycle characteristics. Also, lithium ion conductivity when swelling polymer particles in an electrolyte is $10^{-4}$ S·cm or more, preferably $1 \times 10^{-3}$ S·cm or more. The higher lithium ion conductivity is, the more load characteristics tend to be improved.

As an electrolyte, an organic electrolyte obtained by dissolving supporting electrolyte in an organic solvent is used. As a supporting electrolyte, lithium salt can be used. As a lithium salt, although not particularly limited, there may be mentioned $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)NLi$, etc. Among these, $LiPF_6$, $LiClO_4$ and $CF_3SO_3Li$, which are easy to be dissolved in solvent and show high dissociation degree, are preferable. Two or more of these can be used in combination. Use of the supporting electrolyte having higher dissociation degree causes higher lithium ion conductivity, so that lithium ion conductivity can be controlled with a type of the supporting electrolytes.

As an organic solvent used in the electrolyte, any one dissolvable of the supporting electrolyte can be used without particular limitation, and carbonates such as dimethyl carbonate (DMC), ethylene carbonate (EC), diethyl carbonate (DEC), propylene carbonate (PC), butylene carbonate (BC) and methylethyl carbonate (MEC); esters such as γ-butyrolactone and methyl formate; ethers such as 1,2-dimethoxyethane and tetrahydrofuran; sulfur containing compounds such as sulfolane and dimethylsulfoxide; may be preferably used. Also, a mixture of these solvents may be used. Among these, carbonates are preferable due to its high dielectric constant and broad range of stable electric potential. The lower viscosity of the used solvent is, the higher lithium ion conductivity is, so that lithium ion conductivity can be controlled with a type of the solvents.

The concentration of the supporting electrolyte in the electrolyte is normally 1 to 30 wt %, preferably 5 wt % to 20 wt %. Also, the concentration of the supporting electrolyte is normally 0.5 to 2.5 moles/L depending on the type. When the concentration of the supporting electrolyte is either too low or too high, ion conductivity tends to be lowered. The lower concentration of the electrolyte is, swelling degree of the polymer particles may be increased, so that lithium ion conductivity can be controlled with changing the concentration of the electrolyte.

The polymer particles used in the present invention can be properly selected so as to have the above ranges of swelling degree and lithium ion conductivity depending on the electrolyte. A method to obtain the polymer particles is not particularly limited, and there may be applied either a method to simultaneously perform crosslinking and polymerization reactions to obtain particles configuration of polymers; or a method to first produce crosslinkable polymers followed by cross linking the same to obtain polymer particles. In addition, the cross-linked polymer may be subject to, for example, pulverization to obtain a desired particle size of polymer particles. Specifically, by pulverizing the polymer with a bead mill, a jet mill, shear pulverization method, etc., the polymer can be made a particle configuration.

Particularly, the polymer particles used in the present invention is preferably obtained by crosslinking polymerizable polymers by heat or energy irradiation. By crosslinking polymerizable polymers by heat or energy irradiation, crosslink density can be controlled by heat intensity or energy irradiation intensity. The higher crosslink density is, the smaller swelling degree is, so that swelling degree can be controlled by changing crosslink density. In particular, since it is easy to control crosslink density, the polymer particles are more preferably obtained by crosslinking polymerizable polymers by heat.

The number average particle size of the polymer particles used in the present invention is normally 0.01 to 10 μm, preferably 0.05 to 1 μm. When the particle size is too large, required amount as a binder may be too large and internal resistance of the obtained battery may be increased. On the other hand, too small particle size may cause to cover up the surface of the electrode active material to inhibit a reaction. In this context, the number average particle size is obtained by observing 300 polymer particles through a scanning electron microscope and calculating as an arithmetic mean-value of the major axes of the particles.

Preferably, the polymer used in the present invention includes a structure having a lone electron-pair. By including the structure having a lone electron-pair, it is possible to obtain polymer particles having high lithium ion conductivity even when swelling degree is relatively low. In particular, ether bond is preferable due to high mobility of lithium ions; and nitrile group is preferable due to high fluid retention of the electrolyte and high binding property of the obtained electrodes.

Among the above, a polymer having a nitrile group containing monomer unit (hereinafter, it may be simply referred to as "nitrile group containing polymer"), and a polymer having an ether bond are preferable due to particularly excellent lithium ion conductivity. The more ratios of nitrile group and ether bond in the polymer are, the higher lithium ion conductivity may be.

It is preferred that the nitrile group containing polymer is a copolymer of a nitrile group containing monomer and other monomer copolymerizable therewith. As a nitrile group containing monomer, there may be mentioned an $\alpha,\beta$-unsaturated nitrile compound such as acrylonitrile and methacrylonitrile, and acrylonitrile is preferable. The ratio of nitrile group containing monomer units in the nitrile group containing polymer is preferably 30 to 95 wt %, more preferably 40 to 90 wt %. By including nitrile groups in the above ratio, fluid retention of the electrolyte may become high and electrolyte swelling property can be controlled. In addition, since binding property of the obtained electrode is high, cycle characteristics are improved.

As other copolymerizable monomers, there may be mentioned vinyl esters such as vinyl formate, vinyl acetate, vinyl propionate, isopropenyl acetate, vinyl valerate, vinyl caprate, vinyl laurate, vinyl stearate, vinyl benzoate, vinyl versatate, and vinyl pivalate; N-vinyl pyrrolidone; acrylic esters such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxypropyl acrylate and lauryl acrylate; methacrylic esters such as methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxypropyl methacrylate and lauryl methacrylate; 1-olefines such as ethylene, propylene and 1-butene; conjugated dienes such as 1,3-butadiene, 2-methyl-1,3-butadiene (isoprene), 2,3-dimethyl-1,3-butadiene and 1,3-pentadiene; unsaturated monocarboxylic acids such as acrylic acid, methacrylic acid, crotonic acid and isocrotonic acid; and unsaturated dicarboxylic acids such as maleic acid, fumaric acid, citraconic acid, mesaconic acid, glutaconic acid and itaconic acid and acid anhydrides thereof; etc.

A method to produce a nitrile group containing polymer is not particularly limited. For example, it can be obtained by copolymerizing nitrile group containing monomers and other copolymerizable monomers by a known polymerization method such as emulsion polymerization method, suspension polymerization method, dispersion polymerization method, solution polymerization method or bulk polymerization method.

For example a polymer having an ether bond has a polyalkylene oxide chain in its main chain or side chain. From the perspective that lithium ion conductivity of the obtained polymer is superior, it is preferred to have a polyalkylene oxide chain in the main chain. The polymer having a polyalkylene oxide chain in main chain (hereinafter it may be simply referred to as "polyether polymer") can be obtained by ring-opening polymerization of epoxy group containing monomers.

As an epoxy group containing monomer, there may be mentioned alkylene oxide such as ethylene oxide, propylene oxide, 1,2-epoxybutane, 1,2-epoxy-isobutane, 2,3-epoxybutane, 1,2-epoxyhexane, 1,2-epoxyoctane, 1,2-epoxydecane, 1,2-epoxytetradecane, 1,2-epoxy hexadecane, 1,2-epoxyoctadecane, 1,2-epoxy eicosane, 1,2-epoxycyclopentane, 1,2-epoxycyclohexane and 1,2-epoxycyclododecane; cyclic aliphatic epoxide such as cyclohexene oxide; alkylglycidyl ether such as methylglycidyl ether, ethylglycidyl ether and butylglycidyl ether; nonethylenic unsaturated epoxide such as styrene oxide and phenyl glycidyl ether; oxirane monomer having an oligo oxyethylene chain such as 2-((2-methoxyethoxy)methyl)oxirane and 2-((2-(methoxyethoxy)ethoxy)methyl)oxirane; etc. Two or more of these can be used in combination. Among the above compounds, ethylene oxide, propylene oxide and 1,2-epoxy butane, which show high polymerization reactivity, are preferable, and ethylene oxide, showing high lithium ion conductivity, is particularly preferable.

Further, a monomer having crosslinkable group and epoxy group is preferable since crosslinkable polymer can be easily obtained by copolymerizing the monomers. As a crosslinkable group, carbon-carbon double bond and halogen atom may be mentioned, and the carbon-carbon double bond is preferable due to easy to crosslink and to control crosslink density. As a monomer having carbon-carbon double bond and epoxy group, for example, there may be mentioned unsaturated glycidyl ether such as vinyl glycidyl ether, allyl glycidyl ether, butenyl glycidyl ether and o-allyl phenylglycidyl ether; monoepoxide of diene or polyene such as butadiene monoepoxide, chloroprene monoepoxide, 4,5-epoxy-2-pentene, 3,4-epoxy-1-vinyl cyclohexene and 1,2-epoxy-5,9-cyclododecadiene; alkenyl epoxide such as 3,4-epoxy-1-butene, 1,2-epoxy-5-hexene and 1,2-epoxy-9-decene; glycidyl esters of unsaturated carboxylic acids such as glycidyl acrylate, glycidyl methacrylate, glycidyl crotonate, glycidyl-4-heptenoate, glycidyl sorbate, glycidyl linolate, glycidyl-4-methyl-3-pentenoate, glycidyl ester of 3-cyclohexene carboxylic acid and glycidyl ester of 4-methyl-3-cyclohexene carboxylic acid; etc.

As a monomer having halogen atom and epoxy group, for example, there may be mentioned epihalohydrin such as epichlorohydrin, epibromohydrin, epiiodohydrin, epifluorohydrin and β-methyl epichlorohydrin; p-chlorostyrene oxide; dibromophenyl glycidyl ether; etc.

The amount of the ethylene oxide monomer unit in the polyether polymer is preferably 70 to 99 mole %, more preferably 75 to 97 mole % and particularly preferably 80 to 96 mole %. Also, the amount of the monomer unit having crosslinkable group and epoxy group is preferably 1 to 15 mole %, more preferably 2 to 11 mole %. When the amount of the ethylene oxide monomer unit in the polyether polymer is within the above-mentioned range, lithium conductivity becomes good, and when the amount of the monomer unit having crosslinkable group and epoxy group is within the above-mentioned range, swelling degree in the electrolyte becomes good.

A polymerization catalyst for polymerizing the above monomers is not particularly limited, and for example, any catalyst known as a ring-opening polymerization catalyst for monomers having epoxy group, such as a catalyst obtained by reacting organoaluminum with water and acetylacetone, a catalyst obtained by reacting triisobutyl aluminum with phosphoric acid and triethyl amine, a catalyst obtained by triisobutyl aluminum with an organic acid salt of diazabicyclo undecene and phosphoric acid, a catalyst comprised of partial hydrolysate of aluminum alkoxide and organozinc compound, a catalyst comprised of organozinc compound and polyvalent alcohol and a catalyst comprised of dialkylzinc and water, can be used.

As a polymerization method, there may be used a solution polymerization method using an organic solvent soluble of the generated polymer, or solvent slurry polymerization method using an organic solvent insoluble of the generated polymer, etc., and it is preferable to apply the solvent slurry polymerization method using n-pentane, n-hexane, cyclopentane, etc. Also, among the solvent slurry polymerization methods, two-step polymerization method, in which a seed is preliminarily polymerized and then the particle of the seed is enlarged for completing polymerization, is preferable since an amount of scales adhered to an inner wall of a reactor vessel is small.

As a crosslinking agent used to crosslink nitrile group containing polymer and polyether polymer, there may be mentioned a crosslinking agent activated by heat and a crosslinking agent activated by energy irradiation, and the crosslinking agent activated by heat is preferable. As the crosslinking agent activated by heat, although not particularly limited, radical initiator such as organic peroxide and azo compound may be preferably used.

As the organic peroxide, for example, there may be mentioned ketone peroxides such as methyl ethyl ketone peroxide, methyl isobutyl ketone peroxide, cyclohexanone peroxide and methyl cyclohexanone peroxide; acyl peroxides such as propionyl peroxide, 3,5,5-trimethylhexanoyldecanoyl peroxide, lauroyl peroxide and benzoyl peroxide; hydroperoxides such as tert-butyl hydroperoxide, cumene hydroperoxide, diisopropyl benzene hydroperoxide and p-menthan hydroperoxide; dialkyl peroxides such as di-tert-butyl peroxide, tert-butyl cumyl peroxide and dicumyl peroxide; peroxyketals such as 1,4-bis(t-butyl peroxy diisopropyl)benzene, 1,1-bis(t-butyl peroxy)-3,5,5-trimethyl cyclohexane and n-butyl-4,4'-bis(tert-butyl peroxy)butane; alkyl peresters such as tert-butyl peroxyacetate, tert-butyl peroxyisobutyrate, tert-butyl peroxyoctoate and 2,5-dimethyl-2,5-dibenzoyl peroxyhexane; peroxy carbonates such as di-2-ethyl hexylperoxy dicarbonate and diisopropyl peroxy dicarbonate; water-soluble peroxides such as succinic acid peroxide; alkylsilyl peroxides such as t-butyl trimethylsilyl peroxide; etc.

As a diazo compound, there may be mentioned 4,4'-bisazide benzal (4-methyl)cyclohexanone, 4,4'-diazide chalcone, 2,6-bis(4'-azide benzal)cyclohexanone, 2,6-bis(4'-azide benzal)-4-methyl cyclohexanone, 4,4'-diazide diphenylsulfone, 4,4'-diazide diphenylmethane, 2,2'-diazide stilbene, etc.

Among these, organic peroxides are preferable due to high degree of cross-linking and easy-control in crosslink density. Crosslink density and swelling degree can be controlled, depending on the amount of the crosslinking agent, crosslinking time and crosslinking temperature. The amount of the crosslinking agent is normally 0.1 to 10 parts by weight, preferably 0.2 to 7 parts by weight and more preferably 0.3 to 5 parts by weight with respect to 100 parts by weight of the polymer. When the amount of the crosslinking agent is within the range, the swelling degree in the electrolyte can be easily controlled in the above range.

The binder used in the present invention may include a polymer other than the above polymer particles as far as not deteriorating the effects of the present invention. As the other polymer, for example, fluorine resin such as polytetrafluoroethylene and polyvinylidene-fluoride may be mentioned.

The electrode active material used in the present invention is a compound storable and releasable of lithium ion. The electrode active material for positive electrode (positive electrode active material) is normally classified into the one comprised of inorganic compounds and the one comprised of organic compound. As the positive electrode active material comprised of inorganic compounds, there may be mentioned transition metal oxide, composite oxide of lithium and transition metal, transition metal sulfide, etc. As the above transition metal, Fe, Co, Ni, Mn, etc. may be used. As a specific example of the inorganic compound used in the positive electrode active material, there may be mentioned transition metal oxide such as MnO, $V_2O_5$, $V_6O_{13}$ and $TiO_2$, composite oxide of lithium and transition metal such as lithium nickelate, lithium cobalate and lithium manganate, and transition metal sulfide such as $TiS_2$, FeS and $MoS_2$. These compounds may be partially element-substituted.

As the positive electrode active material comprised by organic compounds, for example, there may be mentioned polyaniline, polypyrrole, polyacene, disulfide-based compound, polysulfide-based compound, N-fluoropyridinium salt, etc. The positive electrode active material may be a mixture of the above inorganic compounds and organic compounds. The particle size of the positive electrode active material used in the present invention is properly selected depending on many requirements for the battery, but in view of improvements in battery characteristics such as load characteristics and cycle characteristics, 50% volume cumulative diameter is normally 0.1 to 50 μm, preferably 1 to 20 μm. When 50% volume cumulative diameter is within the range, it is possible to obtain a secondary battery having large discharge and charge capacity, and in addition, it is easy to handle when producing later-mentioned electrode slurry and electrode. 50% volume cumulative diameter can be obtained by measuring particle size distribution by laser diffraction.

As the electrode active material for negative electrode (negative electrode active material), there may be mentioned carbon allotrope such as graphite and coke. The active material comprised of said carbon allotrope can be mixed or coated with metal, metallic salt and oxide. Also, as the negative electrode active material, there may be used oxide and sulfate salt of silicon, tin, zinc, manganese, iron, nickel, etc., metallic lithium, lithium alloy such as Li—Al, Li—Bi—Cd and Li—Sn—Cd, lithium transition metal nitride, silicon, etc. The particle size of the negative electrode active material is properly selected depending on many requirements for the battery, but in view of improvements in battery characteristics such as initial efficiency, load characteristics and cycle characteristics, 50% volume cumulative diameter is normally 1 to 50 μm, preferably 15 to 30 μm.

An amount ratio of the electrode active material and the above binder is normally 0.1 to 30 parts by weight, preferably 0.2 to 20 parts by weight and more preferably 0.5 to 10 parts by weight of the binder with respect to 100 parts by weight of the electrode active material. When the amount of the binder is within the range, the obtained electrode can be excellent in binding force between the collector and active material layer, and within the active material layer, and it is possible to obtain a battery showing small internal resistance and excellent cycle characteristics.

The positive electrode and negative electrode of the lithium-ion secondary battery of the present invention are configured by binding the active material layer, including the above electrode active material and binder, to the collector. The active material layer can include additives showing a variety of functions, such as a thickener, an electrical conducting material and a reinforcement material, if needed in addition to the electrode active material and binder. As the thickener, a polymer soluble in dispersion medium used for the later-mentioned electrode slurry can be used. Specifically, when the dispersion medium is water, the thickener may be cellulose-based polymer such as carboxymethylcellulose and methylcellulose, and ammonium salt or alkali metal salt thereof. Also, when the dispersion medium is organic solvent, acrylonitrile-butadiene copolymer hydride, etc. can be used. As the electrical conducting material, any material providing electrical conductivity can be used without any limitation, and normally, there may be mentioned carbon powder such as acetylene black, carbon black and graphite, fiber or foil of a variety of metals, etc. As the reinforcement material, there can be used a variety of inorganic and organic fillers, which are spherical-shaped, plate-like, rod-like or fibriform.

Further, in the lithium-ion secondary battery of the present invention, there can be used trifluoropropylene carbonate, vinylene carbonate, catechol carbonate, 1,6-dioxaspiro[4,4]nonane-2,7-dione and 12-crown-4-ethers, etc., to increase stability and lifetime of the battery, which can be included to use in the active material layer or electrolyte.

A method for forming the active material layer is not particularly limited, and it is preferable to dissolve or disperse the above electrode active material, binder and the above optionally-added additives in the dispersion medium to prepare the electrode slurry, and to coat the obtained electrode slurry onto the collector followed by drying to form the active material layer.

As the dispersion medium, water or organic solvent can be used. The organic solvents is not particularly limited. As an example of the organic solvent, there may be mentioned hydrocarbons such as n-hexane, n-dodecane, decahydronaphthalene and tetralin; alcohols such as 2-ethyl-1-hexanol; ketones such as phorone and acetophenone; esters such as benzyl acetate, isopentyl butyrate, γ-butyrolactone, methyl lactate, ethyl lactate and butyl lactate; amines such as toluidine; amides such as N-methyl-2-pyrolidone (NMP), N,N-dimethyl acetamide and dimethyl formamide; sulfoxides/sulfones such as dimethylsulfoxide and sulfolane; etc.

An amount of the dispersion medium may be adjusted so as to have preferable viscosity for coating depending on a type of the electrode active material or binder, etc. Specifically, a concentration of the combined solid contents of the electrode active material, binder and other additives is adjusted to preferably 30 to 90 wt %, more preferably 40 to 80 wt %.

The electrode slurry can be obtained by mixing the electrode active material, binder, optionally added additives and dispersion medium by using a mixer. Mixing may be performed by collectively placing each of the above components in the mixer, mixing and dispersing, but it is preferable to mix the electrical conducting material and thickener in the dispersion medium, to disperse the electrical conducting material in particle state followed by adding the dispersion liquid, in which the electrode active material and binder are dispersed in the dispersion medium, and to further mix them. As the mixer, there may be used a ball mill, a sand mill, a pigment disperser, a stone mill, an ultrasonic disperser, a homogenizer, a planetary mixer, a Hobart mixer, etc., and it is preferable to use the ball mill since it allows controlling agglomeration of the electrode active material.

As the collector, although not particularly limited as far as it has conducting properties, metallic foil such as aluminum foil and copper foil is normally used. The thickness of the metallic foil is not particularly limited, and is normally 1 to 50 μm, preferably 1 to 30 μm. When the collector is too thin, mechanical strength may be reduced to cause production problems such as frequent occurrences in fracture and wrinkle; and when it is too thick, the battery capacity in whole tends to decline. Preferably, the collector has the roughened surface to increase bonding strength with the active material layer. A roughening method may include mechanical method of polishing, electropolishing and chemical polishing. In the mechanical method of polishing, abrasive cloth paper fixed with abrasive powders, grinding stone, emery buff, wire brush provided with steel wire, etc., can be used. Also, an intermediate layer may be formed on the surface of the collector to increase bonding strength with the active material layer and conductive property.

The lithium-ion secondary battery of the present invention can be obtained by assembling the above positive electrode, negative electrode and electrolyte with conventionally-known components such as separator and battery case. A specific production method may include, for example, superimposing the positive electrode and negative electrode via the separator, winding or bending it in conformity with the battery shape to fit in the battery case, filling the electrolyte in the battery case, and sealing the case. In addition, if needed, an expanded metal, an overcurrent prevention element such as fuse and PTC element, lead board, etc. may be set in to prevent pressure increase in the battery and excess discharge and charge. The shape of the battery may be any one such as coin shape, button shape, sheet shape, cylinder shape, square shape and flattened shape.

EXAMPLES

Hereinafter, the present invention will be further specifically described based on Examples and Comparative examples, but the present invention is not limited to these Examples. Note that "parts" and "%" in the Examples and Comparative Examples indicate a weight base unless otherwise designated. Each property in the Example and Comparative Example was measured as below.

(1) Average Particle Size

The average particle size of the polymer particles (number average particle size) was obtained by observing 300 particles by a scanning electron microscope and calculating an average of major axes thereof.

(2) Swelling Degree

The polymer particles were press molded at 70° C. and a pressure of 30 MPa for 1 minute to obtain a sheet-like molded body with a thickness of 100 μm. The sheet-like molded body was cut out to have a length of 20 mm and a width of 20 mm, dipped in the 60° C.-electrolyte at for 72 hours, followed by pulling out, and wiped out the electrolyte attached to the surface of the molded body. Then, the swelling degree of the polymer particles were obtained as an average rate of changes (%) of lengths of the molded body in a longitudinal direction and in a transverse direction before and after dipping in the electrolyte.

(3) Lithium Ion Conductivity (Li Conductivity)

A sheet-like molded body obtained in a similar way as the above (2) was dipped in the 25° C.-electrolyte for 10 hours and pulled out to wipe out the electrolyte attached to the surface thereof. The molded body was sandwiched by metallic electrodes (cylinder shaped SUS with a diameter of 10 mm) to configure an electrochemical cell, and AC voltage was applied between electrodes in the electrochemical cell. Based on real impedance intercept in a call-call plot of complex impedance measured by an AC impedance method, a thickness of the sheet-like molded body and an area of the metallic electrode, lithium ion conductivity can be calculated to evaluate by the following standards. Note that the measurement devices were 1287 potentiogalvanostat and 1255B frequency response analyzer produced by Solarton.

A: $10^{-3}$ S·cm or more
B: $10^{-4}$ S·cm or more and less than $10^{-3}$ S·cm
C: $10^{-5}$ S·cm or more and less than $10^{-4}$ S·cm
D: less than $10^{-5}$ S·cm (4) Peel Strength The electrode was cut into rectangular molded body with a width of 2.5 cm and a length of 10 cm to fix it with the active material layer side up. After applying cellophane tape on the surface of the active material layer of the molded body, the cellophane tape was peeled off from one end of the molded body at a rate of 50 mm/min in the 180-degree direction to measure the stress at that time. 10 measurements were performed, and its average was obtained and defined as peel strength to evaluate by the following standards. The larger peel strength indicates the larger binding force of the active material layer to the collector.

A: 0.65 N/cm or more
B: 0.50 N/cm or more and less than 0.65 N/cm
C: 0.40 N/cm or more and less than 0.50 N/cm
D: 0.20 N/cm or more and less than 0.40 N/cm
E: less than 0.20 N/cm (5) Discharge and Charge Cycle Characteristics The coin-shaped batteries obtained in the Examples and Comparative Examples were subject to discharge and charge cycle, in which the batteries were respectively charged to 4.3 V at 20° C. with constant current of 0.1 C, and then discharged to 3.0 V with constant current of 0.1 C. The discharge and charge cycle was repeated up to 100 cycles, and a ratio of the 100th cycled discharged capacity to the initially discharged capacity was defined as a capacity maintenance ratio to evaluate by the following standards. The larger ratio indicates the lower reduction in capacitance as a result of repeated discharge and charge.

A: 85% or more
B: 75% or more and less than 85%
C: 70% or more and less than 75%
D: 50% or more and less than 70%
E: less than 50%

(6) Discharge and Charge Rate Characteristics (Load Characteristics)

Except for changing the constant currents to 2.0 C in the measurement conditions, the discharged capacity was measured in the similar way as the above measurements of discharge and charge cycle characteristics. The ratio of the discharged capacity under the present conditions to the above battery capacity was calculated on percentage, and defined as discharge and charge rate characteristics to evaluate by the following standards. The larger value indicates the smaller internal resistance, allowing rapid discharge and charge.

A: 60% or more
B: 50% or more and less than 60%
C: 40% or more and less than 50%
D: less than 40%

Example 1

To a reaction vessel with an agitator, were added 100 parts of triisobutyl aluminum, 1,000 parts of toluene and 300 parts of diethyl ether, and added with 25 parts of phosphoric acid while stirring. 10 parts of triethyl amine was added to this to obtain a catalyst solution. To another reaction vessel with an agitator, were added 2,000 parts of n-hexane and 80 parts of the above catalyst solution, and added with 5 parts of ethylene oxide for reaction while stirring. Then, mixed monomers of equivalent weights of ethylene oxide and propylene oxide were added in an amount of 10 parts for reaction to form a seed.

The polymerization reaction solution, in which the seed was formed, was added with a mixed solution consisting of 280 parts (75 mole %) of ethylene oxide, 25 parts (5 mole %) of propylene oxide, 195 parts (20 mole %) of glycidyl methacrylate and 300 parts of n-hexane for a reaction at 60° C. for 8 hours. After precipitation, the reaction mixture was vacuum dried at normal temperature to obtain polymer A having polyalkylene oxide chain.

A composition obtained by mixing 100 parts of the obtained polymer A with 10 parts of cumene hydroperoxide (crosslinking agent) was provided into a biaxial extruder, and extruded in film-like shape while crosslinking under conditions of a screw temperature of 80° C., the rotating speed of 150 rpm and a die temperature of 155° C. The obtained film was pulverized at 30° C. by using a jet mill, and then dispersed in hexane. The obtained dispersion liquid was further subjected to pulverization at 35° C. by a bead mill using 0.4 nm beads, followed by filtration with a 0.5 μm-filter. The obtained solid content was vacuum-dried to obtain polymer particles A. The average particle size of the polymer particles A was 153 nm. The polymer particles A was subject to measurements of swelling degree and lithium ion conductivity. The results are shown in Table 1. Note that the electrolyte was a solution obtained by dissolving $LiPF_6$ in a concentration of 1 mole/L into a mixed solvent of ethylene carbonate (EC) and diethyl carbonate (DEC) with a ratio (volume ratio at 20° C.) of EC:DEC=1:2.

Next, 2 parts of the polymer particles A, 100 parts of $LiCoO_2$ powder having an average particle size of 10 μm as a positive electrode active material and 2 parts of acetylene black as an electrical conducting material were mixed, added with 30 parts of hexane as a solvent and mixed by a planetary mixer to obtain electrode slurry A. The obtained electrode slurry A was evenly applied on aluminum foil with a thickness of 20 μm by a doctor blade method, and dried with a dryer at 120° C. for 15 minutes. Then, it was pressed by a biaxial roll press, further dried under reduced pressure in a vacuum-dryer at 0.6 kPa and 250° C. for 10 hours to obtain a positive electrode in which the active material layer is 110 μm in thick.

Then, the obtained positive electrode was cut out in a circle with a diameter of 15 mm. On the active material layer side of the positive electrode, a separator made of circular polypropylene microporous membrane with a diameter of 18 mm and a thickness of 25 μm, metallic lithium used for a negative electrode and expanded metal were stacked in sequence, and stored in a coin-shaped stainless steel outer packaging case (20 mm in diameter, 1.8 mm in height and 0.25 mm in stainless steel thickness) in which a polypropylene packing was set. To the case, electrolyte was inserted not to remain the air, and outer packaging case was covered with a stainless steel cap of mm in thick via polypropylene packing to fix. The battery can was sealed to produce a lithium-ion secondary battery with a diameter of 20 mm and a thickness of about 2 mm. The same electrolyte was used as in measurements of swelling degree and lithium ion conductivity. The measurement result of each property of the obtained positive electrode and battery is shown in Table 1.

TABLE 1

| | Swelling Degree | Li Conductivity | Peel Strength | Cycle Characteristics | Rate Characteristics |
|---|---|---|---|---|---|
| Example 1 | 8% | A | C | C | A |
| Example 2 | 7% | A | A | A | A |
| Comparative Example 1 | 70% | A | E | E | C |
| Comparative Example 2 | 57% | A | D | E | C |
| Comparative Example 3 | 8% | A | E | E | C |
| Comparative Example 4 | 25% | D | A | D | D |
| Example 3 | 6% | B | A | B | B |
| Example 4 | 18% | A | C | C | A |
| Example 5 | 45% | B | B | B | B |

TABLE 1-continued

| | Swelling Degree | Li Conductivity | Peel Strength | Cycle Characteristics | Rate Characteristics |
|---|---|---|---|---|---|
| Comparative Example 5 | 16% | C | B | D | C |

Example 2

To a reaction vessel with an agitator, 1000 parts of ion-exchange water, 200 parts (70 mole %) of acrylonitrile, 46 parts (10 mole %) of methacrylic acid and 140 parts (20 mole %) of glycidyl methacrylate as monomers, 5 parts of cumene hydroperoxide as a crosslinking agent, 5 parts of sodium dodecylbenzene sulfonate as an emulsifier and 5 parts of potassium persulfate as a polymerization initiator were added, and sufficiently agitated followed by heating at 80° C. to polymerize. When the consumed amount of the monomers was 99.0%, the reaction was terminated by cooling to obtain water dispersion of polyacrylonitrile copolymer B which was in a particle state dispersed in water. The obtained water dispersion of polyacrylonitrile copolymer B was heated at 100° C. in a flask with a reflux tube for 24 hours to perform cross-linking reaction. Then, it was filtrated by using a 0.5 μm-filter to remove bulky particles followed by drying to obtain polymer particles B. The average particle size of the polymer particles B was 132 nm. By using the polymer particles B, an electrode and a battery were obtained as in Example 1. The measurement result of each property of the polymer particles B, electrode and battery is shown in Table 1.

Comparative Example 1

After pulverizing the polymer A obtained in the Example 1 at 30° C. by a jet mill, it was dispersed in n-hexane. The obtained dispersion liquid was further pulverized at 35° C. by a bead mill using 0.4 nm-beads, followed by filtration with a 0.5 μm-filter to remove bulky particles. Then, it was dried to obtained polymer particles C. The average particle size of the polymer particles C was 151 nm. By using the polymer particles C, an electrode and a battery were obtained as in Example 1. The measurement result of each property of the polymer particles C, electrode and battery is shown in Table 1.

Comparative Example 2

The water dispersion of polyacrylonitrile copolymer B obtained in the Example 2 was directly filtrated by using a 0.5 μm-filter without cross-linking reaction to remove bulky particles followed by drying, so that polymer particles D having an average particle size of 120 nm was obtained. By using the polymer particles D, an electrode and a battery were obtained as in Example 1. The measurement result of each property of the polymer particles D, electrode and battery is shown in Table 1.

Comparative Example 3

The water dispersion of polyacrylonitrile copolymer B obtained in the Example 2 was added with threefold mass of NMP, and water was evaporated in an evaporator to obtain 10%-NMP dispersion E. Next, 20 parts of NMP dispersion E (2 parts of the solid content), 100 parts of the above positive electrode active material, and 2 parts of acetylene black as an electrical conducting material were mixed, added with 20 parts of hexane as a solvent and mixed in a planetary mixer to obtain electrode slurry E. The obtained electrode slurry E was evenly applied on aluminum foil with a thickness of 20 μm by a doctor blade method, and dried with a dryer at 120° C. for 15 minutes. Then, it was pressed by a biaxial roll press, further dried under reduced pressure in a vacuum-dryer at 0.6 kPa and 250° C. for 10 hours to crosslink, so that an electrode E for a positive electrode, in which the active material layer is 110 μm in thick, was obtained. By using the obtained electrode E for a positive electrode, a battery was obtained as in Example 1. The measurement result of each property of the NMP dispersion E, electrode E for a positive electrode and battery is shown in Table 1.

Comparative Example 4

To a vessel with an agitator, 800 parts of styrene, 600 parts of butadiene, 400 parts of methyl methacrylate, 100 parts of acrylonitrile, 4 parts of ammonium lauryl sulfate, 10 parts of sodium bicarbonate, and 1,000 parts of ion-exchange water were added and mixed to prepare monomer emulsion. In a reaction vessel with an agitator, 10 parts of ethylene diamine tetra-acetic acid, 10 parts of ammonium lauryl sulfate, 3, 500 parts of ion-exchange water and 90 parts of potassium persulfate were added, and sufficiently agitated followed by heating at 80° C. All of the above monomer emulsion was continuously added to the reaction vessel over a period of 5 hours for performing polymerization reaction. After completing addition of the monomer emulsion, the reaction was continued while keeping at 80° C. with agitating for another 4 hours, so that water dispersion of polymer particles F was obtained. The water dispersion was filtrated by using a 0.5 μm-filter to remove bulky particles followed by drying to obtain polymer particles F. The yield was 99%, and the average particle size was 140 nm. By using the polymer particles F, an electrode and a battery were obtained as in Example 1. The measurement result of each property of the polymer particles F, electrode and battery is shown in Table 1.

Example 3

To a reaction vessel with an agitator, 1000 parts of ion-exchange water, 143 parts (50 mole %) of acrylonitrile, 138 parts (30 mole %) of methacrylic acid and 140 parts (20 mole %) of glycidyl methacrylate as monomers, 6 parts of cumene hydroperoxide as a crosslinking agent, 5 parts of sodium dodecylbenzene sulfonate as an emulsifier and 5 parts of potassium persulfate as a polymerization initiator were added, sufficiently agitated followed by heating at 80° C. to polymerize. When the consumed amount of the monomers was 99.0%, the reaction was terminated by cooling to obtain water dispersion of polyacrylonitrile copolymer G which was in a particle state dispersed in water. The obtained water dispersion of polyacrylonitrile copolymer G was heated at 100° C. in a flask with a reflux tube for 24 hours to perform cross-linking reaction. Then, it was filtrated by using a 0.5 μm-filter to remove bulky particles followed by drying to obtain polymer particles G. The average particle size of the polymer particles G was 143 nm. By using the polymer particles G, an electrode and a battery were obtained as in Example 1. The measurement result of each property of the polymer particles G, electrode and battery is shown in Table 1.

Example 4

100 parts of the polymer A prepared in Example 1 were mixed with 10 parts of cumene hydroperoxide (crosslinking agent). The obtained composition was provided into a biaxial extruder to extrude in a film-like shape while crosslinking under conditions of a screw temperature of 70° C., the rotating speed of 150 rpm and a die temperature of 135° C. The obtained film was pulverized at 30° C. by using a jet mill, and then dispersed in hexane. The obtained dispersion liquid was further subjected to pulverization at 35° C. by a bead mill using 0.4 nm beads, followed by filtration by a 0.5 μm-filter. The obtained solid content was vacuum-dried to obtain polymer particles H. The average particle size of the polymer particles H was 145 nm. By using the polymer particles H, an electrode and a battery were obtained as in Example 1. The measurement result of each property of the polymer particles H, electrode and battery is shown in Table 1.

Example 5

To a reaction vessel with an agitator, 1000 parts of ion-exchange water, 114 parts (40 mole %) of acrylonitrile, 184 parts (40 mole %) of methacrylic acid and 140 parts (20 mole %) of glycidyl methacrylate as monomers, 2 parts of cumene hydroperoxide as a crosslinking agent, 5 parts of sodium dodecylbenzene sulfonate as an emulsifier, and 5 parts of potassium persulfate as a polymerization initiator were added and sufficiently agitated, followed by heating at 80° C. to polymerize. When the consumed amount of the monomers was 99.0%, the reaction was terminated by cooling to obtain water dispersion of polyacrylonitrile copolymer I which was in a particle state dispersed in water. The obtained water dispersion of polyacrylonitrile copolymer I was heated at 90° C. in a flask with a reflux tube for 12 hours to perform cross-linking reaction. Then, it was filtrated by using a 0.5 μm-filter to remove bulky particles followed by drying to obtain polymer particles I. The average particle size of the polymer particles I was 125 nm. By using the polymer particles I, an electrode and a battery were obtained as in Example 1. The measurement result of each property of the polymer particles I, electrode and battery is shown in Table 1.

Comparative Example 5

TO a reaction vessel with an agitator, 1000 parts of ion-exchange water, 100 parts (35 mole %) of acrylonitrile, 207 parts (45 mole %) of methacrylic acid and 140 parts (20 mole %) of glycidyl methacrylate as monomers, 4 parts of cumene hydroperoxide as a crosslinking agent, 5 parts of sodium dodecylbenzene sulfonate as an emulsifier, and 5 parts of potassium persulfate as a polymerization initiator were added and sufficiently agitated, followed by heating at 80° C. to polymerize. When the consumed amount of the monomers was 99.0%, the reaction was terminated by cooling to obtain water dispersion of polyacrylonitrile copolymer J which was in a particle state dispersed in water. The obtained water dispersion of polyacrylonitrile copolymer J was heated at 100° C. in a flask with a reflux tube for 12 hours to perform cross-linking reaction. Then, it was filtrated by using a 0.5 μm-filter to remove bulky particles followed by drying to obtain polymer particles J. The average particle size of the polymer particles J was 131 nm. By using the polymer particles J, an electrode and a battery were obtained as in Example 1. The measurement result of each property of the polymer particles J, electrode and battery is shown in Table 1.

From the above results, when using the polymer particles, in which swelling degree in the electrolyte is 5 to 50% and lithium ion conductivity when swelling with the electrolyte is $1\times10^{-4}$ S·cm or more, as a binder, it was possible to obtain a lithium-ion secondary battery, excellent in binding strength, cycle characteristics and load characteristics (Examples). On the other hand, when using a non-cross-linked polymer particles with high swelling degree as a binder, the results were inferior in any of binding strength, cycle characteristics and load characteristics (Comparative Examples 1 and 2). Also, in case of using a non-particulate binder resulted from crosslinking after forming active material layers, even if swelling degree and lithium ion conductivity were within the above ranges, any of binding strength, cycle characteristics and load characteristics were inferior (Comparative Example 3). Also, when using polymer particles, having swelling degree within the above range but low lithium ion conductivity, as a binder, the results were excellent in binding strength but low in cycle characteristics and load characteristics (Comparative Examples 4 and 5).

What is claimed:

1. A lithium-ion secondary battery comprising a positive electrode, a negative electrode and an electrolyte, said positive electrode and negative electrode being configured by binding an active material layer, including an electrode active material and a binder, to a collector, wherein
    the binder used for at least one of the positive electrode or negative electrode includes polymer particles comprising
    a cross-linked nitrile group containing polymer composed of a copolymer of at least a nitrile group containing monomer and a monomer having a carbon-carbon double bond and an epoxy group, or
    a cross-linked polymer having a polyalkylene oxide chain in its main chain composed of a copolymer of at least a monomer containing an epoxy and a monomer having a carbon-carbon double bond and an epoxy group, and
    wherein the polymer particles satisfy the following properties:
    swelling degree of a sheet-like molded body, which is obtained by pressure molding of only the polymer particles, in an organic electrolyte obtained by dissolving a lithium salt into carbonates, is 5 to 50% as an increase in length, and lithium ion conductivity of the polymer particles swollen by the organic electrolyte is $1\times10^{-4}$ S·cm or more,
    and when the nitrile group is present, the ratio of nitrile group containing monomer unit in the polymer is 30 to 95 wt %.

2. The lithium-ion secondary battery as set forth in claim 1, wherein a number average particle size of said polymer particles is 0.01 to 10 μm.

3. The lithium-ion secondary battery as set forth in claim 1 or 2, wherein said polymer particles are a cross-linked polymer that is cross-linked by heat or energy irradiation.

4. The lithium-ion secondary battery as set forth in claim 1, wherein the organic electrolyte is obtained by dissolving $LiPF_6$ in a concentration of 1 mole/L into a mixed solvent of ethylene carbonate and diethyl carbonate with a ratio of ethylene carbonate to diethyl carbonate of 1:2 in terms of volume ratio at 20° C.

\* \* \* \* \*